Patented June 27, 1939

2,163,899

UNITED STATES PATENT OFFICE 2,163,899

METHOD OF PREVENTING FORMATION OF ICE CRYSTALS IN REFRIGERANTS

Walter O. Walker and William R. Rinelli, Marinette, Wis., assignors to Ansul Chemical Company, Marinette, Wis., a corporation of Wisconsin No Drawing. Application June 29, 1938,
Serial No. 216,596

7 Claims. (Cl. 62—178)

This invention relates to the addition of suitable compounds or mixtures thereof to a working fluid of a refrigerating machine comprising a hydrocarbon halide refrigerant, mixtures of hydrocarbon halide refrigerants or oil mixtures of same to prevent ice crystal formation in refrigerating systems and to dissolve ice crystals which may be formed at temperatures encountered in refrigerating machines.

A persistent and well recognized source of difficulty encountered in operating refrigerating machines arising from the use of hydrocarbon halide refrigerants and mixtures thereof, such as methyl chloride, methyl chloride having acrolein added thereto as a detector or warning agent, methylene chloride (Carrene), "Freon 12" (dichlorodifluoromethane), "Freon 11" (Carrene No. 2) (trichloromonofluoromethane), and dichlorotetrafluoroethane ("Freon 114") is the separation of water in the form of ice crystals which cause freeze-ups at expansion valves, and/or other constricted places in the machine thereby affecting the normal operation of a refrigerating machine.

We have discovered that certain chemical compounds or mixtures thereof, when added to the commonly employed hydrocarbon halide refrigerants, mixed hydrocarbon halide refrigerants, or oil-hydrocarbon halide refrigerant mixtures, produce a mixture having a solubility for water great enough to prevent the formation of ice crystals and/or to dissolve formed ice crystals at temperatures ordinarily encountered in refrigerating machines employing hydrocarbon halide refrigerants and mixtures thereof.

While total miscibility of the compounds or mixtures thereof, with hydrocarbon halide refrigerants or mixtures thereof, oil-hydrocarbon halide refrigerant, or oil-mixed hydrocarbon halide refrigerants mixtures and with water is most desirable, we have found that certain compounds or mixtures thereof, which possess partial miscibility with hydrocarbon halide refrigerants or mixtures thereof, oil-hydrocarbon halide refrigerant or oil-mixed hydrocarbon halide refrigerants mixtures and with water dissolve formed ice crystals and/or prevent the formation of ice crystals at the usual temperatures encountered in a refrigerating machine employing hydrocarbon halide refrigerants or mixtures thereof.

Moreover the addition of these chemical compounds or mixtures thereof either does not result in any substantial corrosion and/or other undesirable reactions and/or other undesirable effects which may affect normal operation of the refrigerating machine. In addition the boiling point of the hydrocarbon halide refrigerant or mixtures thereof is not materially changed.

These chemical compounds or mixtures thereof may be added to the refrigerant in any suitable manner. They may be added directly to a refrigerating machine already charged with a hydrocarbon halide refrigerant or mixture thereof or oil-hydrocarbon halide refrigerant or oil-mixed hydrocarbon halide refrigerant mixtures; to the oil; to the hydrocarbon halide refrigerant or mixtures thereof; to the oil-hydrocarbon halide refrigerant or oil-mixed hydrocarbon halide refrigerant mixtures; and if desired, to an uncharged machine in which the refrigerant is later charged.

We have found, after considerable experimentation, that the following ice crystal solvents are suitable for the purpose of our invention, which may be used singly or in mixtures thereof. We have found it advantageous to use the following alcohol-ether compounds:

Butyl carbitol (diethylene glycol mono butyl ether).
Butyl cellosolve (glycol butyl ether).
Carbitol (diethylene glycol mono ethyl ether).
Cellosolve (ethylene glycol mono ethyl ether).
Diethyl carbitol (diethylene glycol diethyl ether).
Isopropyl cellosolve (ethylene glycol isobutyl ether).
Methyl carbitol (diethylene glycol mono methyl ether).
Methyl cellosolve (ethylene glycol mono methyl ether).

The quantity of the water crystal solvent which we add to the refrigerant working fluid is determined by the nature of the particular ice crystal solvent or solvents selected, the amount of water in the refrigerating system, the minimum temperature to which the refrigerating mixture will be subjected in actual operation and the general operating characteristics of the refrigerating machine. We have found it advantageous to add up to about 10% by volume of the water crystal solvent to the refrigerant working fluid to prevent ice crystal formation at temperatures ordinarily encountered in a refrigerating machine using hydrocarbon halide refrigerants. The quantity of crystal solvent added may be varied depending upon the aforementioned factors for any given refrigerating machine.

We are aware that it has been previously proposed to add methyl alcohol to methyl chloride but this agent has not been effective because decided corrosion of the metal parts of the refrigerating machine occurs, and, furthermore, solid reaction deposits are formed which clog the valves and are thus detrimental to the normal operation of the refrigerating machine. The ice crystal solvents which we have discovered avoid these difficulties as they do not react with the hydrocarbon halide refrigerant. They also do not form solid deposits or produce any substantial corrosion of the metal parts of the machine sufficient to interfere with normal operation.

Briefly, our ice crystal solvents, or mixtures thereof, have the following characteristics:

1. They increase the solubility of a water (low concentration)-refrigerant mixture or mixtures for water, thus preventing the formation of ice crystals at the usual temperatures encountered in a refrigerating machine.

2. They are a liquid, whose viscosity is not excessively high at the temperatures encountered in a machine.

3. They are a liquid which does not solidify at the lowest temperatures encountered in a machine.

4. They will not crystallize from its mixtures with the liquids commonly found in a refrigerating machine.

5. They will not react with the water, oil-refrigerant mixture or mixtures or the metals commonly employed in a machine, or the action is so slight as to be of no practical importance.

6. They will not produce any substantial corrosion of the metal parts in refrigerating machines sufficient to interfere with normal operation.

7. They will prevent crystallization of water in the refrigerating system.

8. They will not permit solid deposits to form in the machine.

Our ice crystal solvents have very low freezing points and consequently do not crystallize at the usual temperatures encountered in a refrigerator. They also do not cause the refrigerant itself to crystallize.

Our reagents are designed to prevent the crystallization of water from the refrigerant with the resulting formation of ice crystals. The temperature above which this crystallization must not take place in order that the reagent be effective is ordinarily about $-40°$ F., as this temperature is generally conceded to be the average lowest temperature at which an expansion valve may operate in certain standard machines.

We may also advantageously add mixtures of our crystal solvents to a single refrigerant as illustrated in the following examples, the proportions being given by volume:

Example 1

| | Per cent |
|---|---|
| Methyl chloride | 90 |
| Cellosolve | 5 |
| Butyl cellosolve | 5 |

Example 2

| | Per cent |
|---|---|
| "Freon 12" | 90 |
| Methyl cellosolve | 5 |
| Methyl carbitol | 5 |

Example 3

| | Per cent |
|---|---|
| Carrene | 90 |
| Cellosolve | 5 |
| Carbitol | 5 |

We may also use mixtures of the compounds, as herein disclosed, with esters and ketones as disclosed in our copending application Serial No. 216,597. In such mixtures the crystal solvents may be mixed in any suitable proportions so as to total about 10% by volume of the final mixture. The following are typical examples, the proportions being given by volume:

Example 4

| | Per cent |
|---|---|
| "Freon 11" | 90 |
| Methyl carbitol | 5 |
| Butyl lactate | 5 |

Example 5

| | Per cent |
|---|---|
| Methyl chloride | 90 |
| Cellosolve | 5 |
| Ethyl lactate | 5 |

Example 6

| | Per cent |
|---|---|
| "Freon 12" | 90 |
| Butyl carbitol | 5 |
| Butyl lactate | 5 |

Example 7

| | Per cent |
|---|---|
| Methyl chloride | 90 |
| Cellosolve | 5 |
| Ethyl lactate | 5 |

Example 8

| | Per cent |
|---|---|
| "Freon 12" | 90 |
| Butyl carbitol | 5 |
| Butyl lactate | 5 |

We have also found that our ice crystal solvents may be added to mixed refrigerants to prevent ice crystal formation, up to about 10% by volume of the crystal solvent being satisfactory for operation in the ordinary refrigerating systems. The following are examples of mixed refrigerants containing one of our crystal solvents, which we have found to be satisfactory, the proportions being given by volume:

Example 9

| | Per cent |
|---|---|
| Methyl chloride | 45 |
| "Freon 12" | 45 |
| Cellosolve | 10 |

Example 10

| | Per cent |
|---|---|
| Methyl chloride | 45 |
| Carrene | 45 |
| Carbitol | 10 |

Example 11

| | Per cent |
|---|---|
| Methyl chloride | 45 |
| "Freon 11" | 45 |
| Isopropyl cellosolve | 10 |

Example 12

| | Per cent |
|---|---|
| "Freon 12" | 30 |
| Carrene | 30 |
| "Freon 11" | 30 |
| Butyl carbitol | 10 |

Example 13

| | Per cent |
|---|---|
| Methyl chloride | 30 |
| "Freon 11" | 30 |
| "Freon 12" | 30 |
| Methyl cellosolve | 10 |

Our invention may also advantageously be applied to mixed hydrocarbon halide refrigerants to which are added mixed crystal solvents. The following mixtures, for example, have been found to be satisfactory, the crystal solvents used being mixed in any suitable proportions and both totaling up to about 10% by volume of the final mixture. The refrigerants may also be mixed in any suitable proportions in this mixture so as to total about 90% by volume of the final mixture.

*Example 14*

Carrene
"Freon 11"
Carbitol
Cellosolve

*Example 15*

Methyl chloride
"Freon 12"
Carrene
Carbitol

*Example 16*

Carrene
"Freon 11"
Isopropyl cellosolve
Cellosolve

*Example 17*

Methyl chloride
"Freon 12"
Carrene
Isopropyl cellosolve
Butyl carbitol

*Example 18*

Methyl chloride
"Freon 12"
Isopropyl cellosolve
Methyl cellosolve

We may also use mixtures of the compounds, as herein disclosed, with esters and ketones as disclosed in our copending application Serial No. 216,597, with mixed refrigerants. The following mixtures, for example, have been found to be satisfactory, the crystal solvents used being mixed in any suitable proportions and both totaling up to about 10% by volume of the final mixture. The refrigerants may also be mixed in any suitable proportions in this mixture so as to total about 90% by volume of the final mixture.

*Example 19*

"Freon 12"
Carrene
"Freon 11"
Diacetone (acetone free)
Methyl carbitol

*Example 20*

Carrene
"Freon 11"
"Freon 114"
Diacetone (acetone free)
Butyl cellosolve

The mixed refrigerants have substantially the same thermodynamic and chemical properties as the corresponding hydrocarbon halide refrigerants, with the added and valuable property of a higher solubility for water which prevents the formation of ice crystals at the temperatures encountered in refrigerating machines.

It is to be understood that our ice crystal solvents may be added to the hydrocarbon halide refrigerant or mixtures of hydrocarbon halide refrigerants as well as to oil-hydrocarbon halide refrigerants or mixtures thereof. Mixtures of oil-hydrocarbon halide refrigerants generally contain about 10% by volume of a suitable lubricating oil. Our ice crystal solvents may be also added directly to the lubricating oil in refrigerating systems.

It is to be understood that our invention is not restricted to the specific embodiments or proportions which have been given as exemplifications of the invention and it is intended to embrace within the scope of the appended claims the broad aspects of the invention except as they may be restricted by the prior art.

We claim:

1. The method of preventing the formation of ice crystals in a compression type of refrigerating system working with a hydrocarbon halide refrigerant which comprises adding to said refrigerant an ice crystal solvent selected from the group consisting of butyl carbitol (diethylene glycol mono butyl ether), butyl cellosolve (glycol butyl ether), carbitol (diethylene glycol mono ethyl ether), cellosolve (ethylene glycol mono ethyl ether), diethyl carbitol (diethylene glycol diethyl ether), isopropyl cellosolve (ethylene glycol isobutyl ether), methyl carbitol (diethylene glycol mono methyl ether), and methyl cellosolve (ethylene glycol mono methyl ether) in sufficient amount to prevent formation of ice crystals under minimum temperature operating conditions and general operating characteristics of the refrigerating machine and up to about 10% by volume of the refrigerant.

2. The method of refrigeration which comprises compressing, condensing, and evaporating a working fluid comprising a hydrocarbon halide refrigerant carrying an ice crystal solvent selected from the group consisting of butyl carbitol (diethylene glycol mono butyl ether), butyl cellosolve (glycol butyl ether), carbitol (diethylene glycol mono ethyl ether), cellosolve (ethylene glycol mono ethyl ether), diethyl carbitol (diethylene glycol diethyl ether) isopropyl cellosolve (ethylene glycol isobutyl ether), methyl carbitol (diethylene glycol mono methyl ether), and methyl cellosolve (ethylene glycol mono methyl ether) in sufficient amount to prevent formation of ice crystals under minimum temperature operating conditions and general operating characteristics of the refrigerating machine and up to about 10% by volume of the refrigerant.

3. The method of preventing the formation of ice crystals in a refrigerating system of the compression type working with a hydrocarbon halide refrigerant selected from the group consisting of methyl chloride, methylene chloride, dichlorodifluoromethane, trichloromonofluoromethane, and dichlorotetrafluoroethane which comprises adding to said refrigerant an ice crystal solvent selected from the group consisting of butyl carbitol (diethylene glycol mono butyl ether), butyl cellosolve (glycol butyl ether), carbitol (diethylene glycol mono ethyl ether), cellosolve (ethylene glycol mono ethyl ether), diethyl carbitol (diethylene glycol diethyl ether), isopropyl cellosolve (ethylene glycol isobutyl ether), methyl carbitol (diethylene glycol mono methyl ether), and methyl cellosolve (ethylene glycol mono methyl ether) in sufficient amount to prevent formation of ice crystals under minimum temperature operating conditions and general operating characteristics of the refrigerating machine and up to about 10% by volume of the refrigerant.

4. The method of preventing the formation of ice crystals in a compression type of refrigerating system working with a hydrocarbon halide refrigerant which comprises adding to said refrigerant cellosolve in sufficient amount to prevent formation of ice crystals under minimum temperature operating conditions and general operating characteristics of the refrigerating machine and up to about 10% by volume of the refrigerant.

5. The method of preventing the formation of ice crystals in a compression type of refrigerating system working with a hydrocarbon halide refrigerant selected from the group consisting of methyl chloride, methylene chloride, dichlorodifluoromethane, trichloromonofluoromethane, and dichlorotetrafluoroethane which comprises adding to said refrigerant cellosolve in sufficient amount to prevent formation of ice crystals under minimum temperature operating conditions and general operating characteristics of the refrigerating machine and up to about 10% by volume of the refrigerant.

6. The method of preventing the formation of ice crystals in a compression type of refrigerating system working with a dichlorodifluoromethane which comprises adding to said refrigerant butyl cellosolve in sufficient amount to prevent formation of ice crystals under minimum temperature operating conditions and general operating characteristics of the refrigerating machine and up to about 10% by volume of the refrigerant.

7. The method of preventing the formation of ice crystals in a compression type of refrigerating system working with a dichlorodifluoromethane which comprises adding to said refrigerant cellosolve in sufficient amount to prevent formation of ice crystals under minimum temperature operating conditions and general operating characteristics of the refrigerating machine and up to about 10% by volume of the refrigerant.

WALTER O. WALKER.
WILLIAM R. RINELLI.